(12) United States Patent
Lohar et al.

(10) Patent No.: US 12,401,744 B2
(45) Date of Patent: Aug. 26, 2025

(54) DEFENSIVE DEEPFAKE FOR DETECTING LIVE DEEPFAKED AUDIO AND VIDEO

(71) Applicant: Bank of America Corporation, Charlotte, NC (US)

(72) Inventors: Sanjay Lohar, Charlotte, NC (US); James R. Crocker, Charlotte, NC (US); Kyle Mayers, Charlotte, NC (US); W. Scott Hammet, Charlotte, NC (US); Kelly Renee-Drop Keiter, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 391 days.

(21) Appl. No.: 17/941,100

(22) Filed: Sep. 9, 2022

(65) Prior Publication Data

US 2024/0089371 A1   Mar. 14, 2024

(51) Int. Cl.
| | |
|---|---|
| *H04L 12/66* | (2006.01) |
| *G10L 25/27* | (2013.01) |
| *G10L 25/51* | (2013.01) |
| *H04M 3/00* | (2024.01) |
| *H04M 3/436* | (2006.01) |
| *H04M 5/00* | (2006.01) |

(52) U.S. Cl.
CPC ............ *H04M 3/436* (2013.01); *G10L 25/27* (2013.01); *G10L 25/51* (2013.01)

(58) Field of Classification Search
CPC ......... G10L 17/04; G10L 17/18; G10L 25/51; G10L 17/06; G10L 17/26; G10L 25/30; G10L 15/16; G10L 17/00; G10L 17/24; G10L 15/22; G06F 21/32; G06F 18/22; G06F 21/30; G06F 21/31; H04M 2201/405; H04M 2201/18; H04M 2203/6045; H04M 2201/41; H04M 2203/6054; H04M 3/436; H04M 3/5183; G06N 20/00
See application file for complete search history.

(56) References Cited

U.S. PATENT DOCUMENTS

| | | | |
|---|---|---|---|
| 10,127,911 B2* | 11/2018 | Kim | G10L 17/06 |
| 10,930,263 B1* | 2/2021 | Mahyar | G06N 3/088 |
| 11,611,550 B1* | 3/2023 | Chavez | H04L 63/1433 |
| 2006/0286969 A1* | 12/2006 | Talmor | G06F 21/32 |
| | | | 379/142.01 |

(Continued)

*Primary Examiner* — Kharye Pope
(74) *Attorney, Agent, or Firm* — Weiss & Arons LLP

(57) ABSTRACT

Apparatus and methods for using deepfakes defensively to detect fake, spoofed, and hoax phone calls and videoconferences are provided. A program may record a target individual reciting exemplary phrases. The program may analyze the recordings to create a baseline. The program may use deepfake algorithms to create exemplar deepfake audiovisual representations of the target individual. The program may store the data in a database. The program may analyze, in real-time, a phone call or videoconference to determine whether they are legitimate or illegitimate by comparing the audio or audiovisual contents of the phone call or videoconference with the exemplar deepfakes. When the program determines the phone call or videoconference is illegitimate, the program may terminate the call or videoconference and inform the recipient and others.

20 Claims, 6 Drawing Sheets

(56) References Cited

U.S. PATENT DOCUMENTS

| | | | |
|---|---|---|---|
| 2014/0214676 A1* | 7/2014 | Bukai | G10L 17/24 |
| | | | 705/44 |
| 2014/0297528 A1* | 10/2014 | Agrawal | G06Q 20/40145 |
| | | | 705/44 |
| 2019/0228138 A1* | 7/2019 | Yu | G10L 17/24 |
| 2020/0162610 A1* | 5/2020 | VanBlon | H04M 3/436 |
| 2021/0193150 A1* | 6/2021 | Goodwin | G06F 21/44 |
| 2021/0193159 A1* | 6/2021 | Pearson | G10L 21/0364 |
| 2021/0383810 A1* | 12/2021 | Camenares | G10L 15/1822 |
| 2022/0036904 A1* | 2/2022 | Traynor | G10L 25/51 |
| 2022/0121868 A1* | 4/2022 | Chen | G10L 17/22 |
| 2022/0269922 A1* | 8/2022 | Mathews | G06V 20/46 |
| 2023/0082094 A1* | 3/2023 | Keret | G06F 21/32 |
| | | | 726/2 |
| 2023/0214850 A1* | 7/2023 | Keret | G10L 17/14 |
| | | | 705/317 |

* cited by examiner

DEFENSIVE DEEPFAKE FOR DETECTING LIVE DEEPFAKED AUDIO AND VIDEO

FIELD OF TECHNOLOGY

Aspects of the disclosure relate to providing apparatus and methods for utilizing deepfakes defensively to detect fake and spoofed, i.e., illegitimate, video calls and phone calls, in real-time.

BACKGROUND OF THE DISCLOSURE

Telephonic calls are a primary method of communication today. Increasingly, videoconferencing has supplanted telephonic calls or is used in addition to telephonic calls. Videoconferencing may provide an additional layer of relationship building and connectivity.

However, with the popularity of phone calls and videoconferencing, malicious actors have also increased their activity. Some malicious actors may attempt to use deepfake algorithms to fake and spoof both phone calls and video calls. Deepfakes may trick individuals or entities into thinking that a real person is speaking or appearing on video. (Spoofing may be defined as creating a fake representation of a user.)

This malicious activity may have deleterious and detrimental effects on the individual or entity that has been spoofed.

One method malicious actors may use to spoof or fake phone calls or videoconferencing may be to utilize deepfake technology. Deepfake technology may refer to an image, recording, writing, or other individual identifier that has been convincingly altered and manipulated for misrepresentation and other purposes. Deepfakes may be used in real-time. Deepfakes may be more convincing and appear more accurate than typical altered images, recordings, and writings. Deepfake technology may be energy and processor intensive. Deepfake technology may be increasing in capability and credibility. Malicious actors may periodically improve their deepfake technology and algorithms.

Therefore, it would be desirable for apparatus and methods for utilizing deepfakes defensively to detect fake and spoofed, i.e., illegitimate, videoconferences and phone calls in real-time, and inform recipients of the illegitimacy as well as terminate the calls or videoconferences.

SUMMARY OF THE DISCLOSURE

It is an object of this disclosure to provide apparatus and methods for using deepfakes defensively to detect fake and spoofed, i.e., illegitimate, videoconferences, phone calls, and voicemails, and inform recipients of the calls' illegitimacy while terminating the call(s).

A defensive deepfake computer program product is provided. The computer program product may include executable instructions. The executable instructions may be stored on non-transitory memory. The executable instructions may be executed by a processor on a computer system to perform various functions.

The program may record two or more audio files of a target individual. The audio files may be of the target individual reciting two or more scripted lines. Each scripted line may include ten or more distinct words.

The program may analyze the two or more audio files to determine a voice baseline of the target individual. The analysis may be performed through one or more artificial intelligence/machine learning ("AI/ML") algorithms. The voice baseline may also include one or more phone numbers and names assigned or belonging to the target individual.

The program may create, through one or more AI/ML deepfake algorithms, one or more deepfake voices of the target individual. The deepfake voices may be used as exemplars of what a malicious actor may use in a spoofed or fake phone or video call.

The program may store the two or more audio files, the voice baseline, and the one or more deepfake voices in a database. The database may be present on the same computer as the program or may be on a server or other computer distant from the program.

A recipient may receive a telephonic call, which may include a telephonic voice, from one of the phone numbers or names assigned to or belonging to the target individual.

The program may compare the telephonic voice, in real-time, to the voice baseline and the deepfake voices to determine when the telephonic voice is illegitimate. For example, when the program determines, through the comparison, that the telephonic voice is a deepfake, the program may determine that the telephonic voice is illegitimate.

When the program determines that the telephonic voice is illegitimate, the program may inform the recipient that the call is illegitimate, inform a system administrator that the call is illegitimate, and terminate the telephonic call.

In an embodiment, the program may also request a response from the system administrator as to whether the program's determination that telephonic call or telephonic voice is illegitimate is correct. For example, if the program determines that call X is illegitimate, the program may record the call and transmit the recording to an administrator for a human in the loop determination as to the legitimacy. This determination may be used to refine the comparison algorithm or other algorithms of the program.

In an embodiment, the system administrator may be the target individual. In this embodiment, the program may request the target individual verify or reject the determination that the telephonic voice was fake or spoofed.

In an embodiment, a caller-ID display proximate to the recipient may display a name of the target individual.

In an embodiment, the database may be encrypted.

In an embodiment, the voice baseline, deepfake voices, comparison algorithm, and other determinations may be repeatedly refined. The program may take feedback or analysis through AI/ML algorithms to refine various aspects of its operation, including the determination of voice baselines, other characteristics, creation of deepfakes, comparison of live calls to deepfakes, and determination of legitimate vs. illegitimate voices and calls.

In an embodiment, the recipient may receive a second call, with a second telephonic voice, from an unknown number, not associated with the target individual. This second call may display on a caller-ID display a name of the target individual, even though the number may not be associated with the target individual. In this embodiment, the program may receive an instruction from the recipient to compare the second telephonic voice with the voice baseline and the deepfake voices to determine if the second call is legitimate or illegitimate. When the program determines that the second call is illegitimate, the program may inform the recipient that the second call is illegitimate, inform a system administrator that the second call is illegitimate, and terminate the second telephonic call.

In an embodiment, the program may also record two or more audiovisual files of the target individual. The audiovisual files may include the target individual reciting two or more scripted lines each including ten or more distinct words.

The program may analyze, through one or more artificial intelligence/machine learning ("AI/ML") algorithms, the two or more audiovisual files and determine an audiovisual baseline of the target individual. For example, if the target individual uses certain gestures or moves a facial feature in a particular way when pronouncing specific words more and other visual characteristics. The audiovisual baseline may also include one or more videoconferencing user-IDs or names assigned to or belonging to the target individual.

The program may create, through one or more AI/ML deepfake algorithms, one or more deepfake audiovisual representations of the target individual. The program may store the two or more audiovisual files, the audiovisual baseline, and the deepfake audiovisual representations in the database.

The recipient may join a videoconference with a user displaying a user-ID or name belonging or assigned to the target individual. The program may compare, in real-time, the user's audiovisual representation with the audiovisual baseline, and the deepfake audiovisual representations to determine whether the user's audiovisual representation is legitimate or illegitimate. When the program determines that the user's audiovisual representation is illegitimate, the program may inform the recipient that the videoconference is illegitimate, inform the system administrator that the videoconference is illegitimate, and terminate the videoconference.

In an embodiment, the recipient may receive a voicemail which may include a third telephonic voice. The program may receive an instruction from the recipient to compare the third telephonic voice with the voice baseline and the deepfake voices to determine if the voicemail is legitimate or illegitimate. When the program determines that the voicemail is illegitimate, the program may inform the recipient that the voicemail is illegitimate and inform a system administrator that the voicemail.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
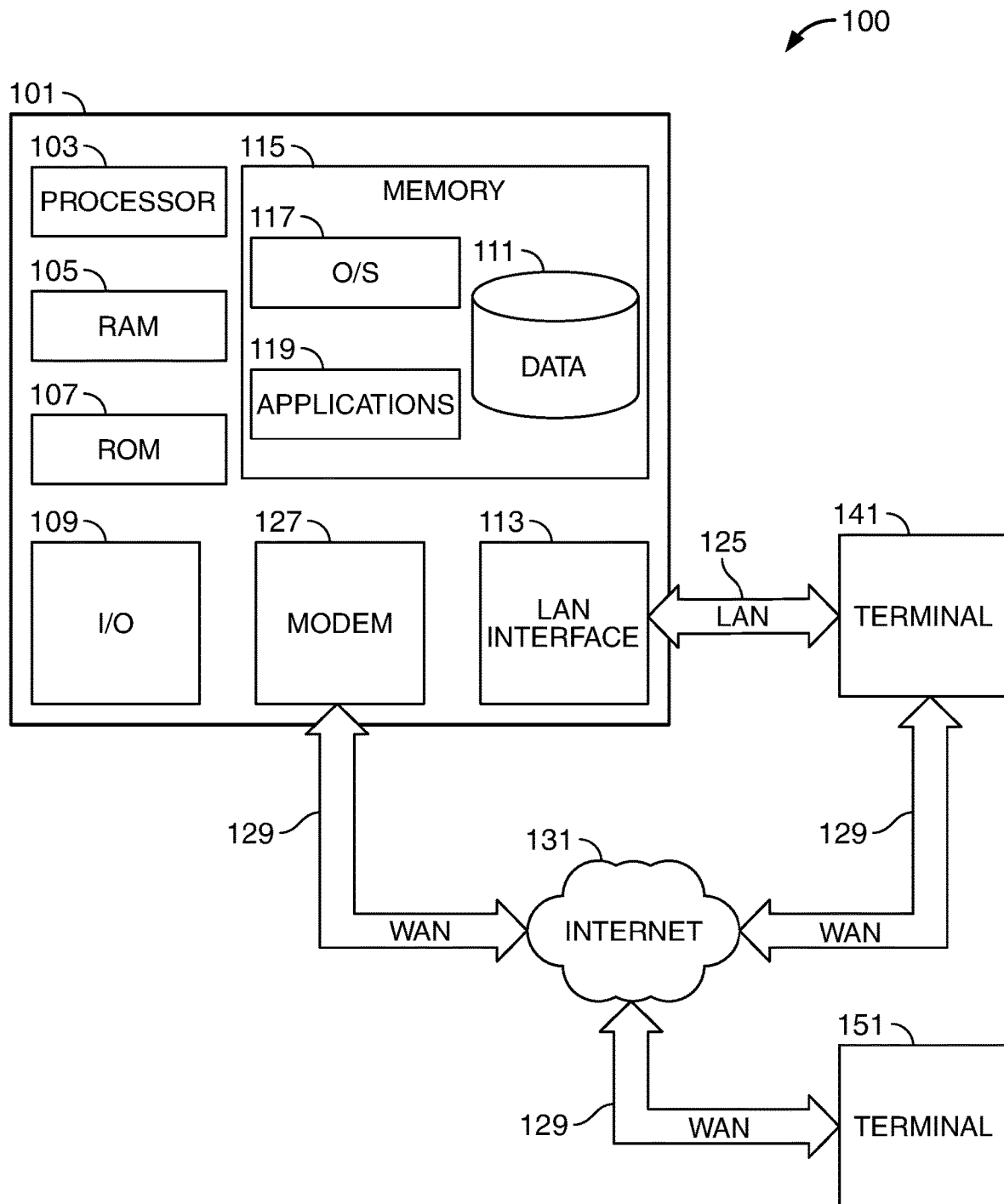
FIG. 1 shows an illustrative apparatus in accordance with principles of the disclosure.

It is an object of this disclosure to provide apparatus and methods for using deepfakes defensively.

A defensive deepfake computer program product is provided. The computer program product may include executable instructions. The executable instructions may be stored on non-transitory memory. The executable instructions may be executed by a processor on a computer system to perform various functions.

Multiple processors may increase the speed and capability of the program. The executable instructions may be stored in non-transitory memory on the computer system or a remote computer system, such as a server.

Other standard components of a computer system may be present. The computer system may be a server, mobile device, or other type of computer system. A server or more powerful computer may increase the speed at which the computer program may run. Portable computing devices, such as a smartphone, may increase the portability and usability of the computer program, but may not be as secure or as powerful as a server or desktop computer.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The computer system may be a server. The computer program may be run on a smart mobile device. The computer program, or portions of the computer program may be linked to other computers or servers running the computer program. The server or servers may be centralized or distributed. Centralized servers may be more powerful and secure than distributed servers but may also be more expensive.

The program may record two or more audio files of a target individual. The audio files may be of the target individual reciting two or more scripted lines. Each scripted line may include ten or more distinct words. The more recordings and the more distinct words recorded may increase the accuracy of any analysis of the recordings. The more varied the distinct words, the more accurate any analysis may be.

In an embodiment, the scripted lines may be provided to the program by a developer or administrator. In another embodiment, the program may automatically create the scripted lines based on various factors, including the needs of various deepfake algorithms.

In an embodiment, the program may gather verified recordings of the target individual instead of recording the target individual reciting scripted lines. The program may proactively research and gather verified recordings from the Internet, a database, or elsewhere. In an embodiment, the program may receive the verified recordings. The program may receive the verified recordings from the target individual, from an administrator, or from another trusted source.

The recordings may be verified by the target individual or another trusted source. For example, the targeted individual may provide the program with two or more verified recordings and verify to the program that they are unaltered recordings of the individual.

The program may use a microphone or a camera with a microphone connected to the computer system to record the target individual. The microphone may be remote from the computer system but in electronic communication with the computer system, over the Internet or another network.

The program may request the target individual record the target individual reciting the scripted lines through the individual's smart mobile device, such as a smartphone. For example, the program may transmit a text message or other link to the individual's mobile phone. The message or link may include the scripted lines and instructions. When the link is opened, the mobile phone's microphone may activate and record the individual reciting the scripted lines. The target individual may then transmit the recordings to the program.

In an embodiment, any language, including English, may be used. Multiple languages may allow for the program to be used more widely and help refine the program's analysis.

The program may analyze the two or more audio files to determine a voice baseline of the target individual or entity. The voice baseline may include auditory features of the target individual's voice that allow the program to identify the target individual's voice. For example, tone, pitch, volume, cadence, and other auditory characteristics. The more unique auditory features identified, the more accurate any identification of the individual may be. In an embodiment, the analysis may be performed with standard voice recognition software or algorithms.

In an embodiment, the analysis may be performed through one or more artificial intelligence/machine learning ("AI/ML") algorithms. The more recordings gathered by or provided to the program, the stronger and more accurate the analysis may be. Any suitable AI/ML algorithm may be used, and multiple algorithms may be appropriate for analyzing more verified recordings.

In an embodiment, if the recordings are insufficient for the program, the program may request the target individual provide further recordings.

The baseline may also include one or more phone numbers associated with the target individual. The baseline may also include one or more names belonging to the target individual. The phone number(s) and name(s) may assist the program in identifying which received phone call or videoconference to compare the baseline with. For example, if the program includes voice baselines for 500 target individuals, a call received from a phone number or name associated with one of those 500 individuals may be compared with the corresponding voice baseline. However, if a call is purportedly received from a person without a voice baseline (i.e., not a target individual), the program may be unable to perform its comparison unless prompted by a recipient of the call.

The program may create, through one or more AI/ML deepfake algorithms, one or more deepfake voices of the target individual. Any standard, existing, or future deepfake algorithm may be used. As deepfake algorithms improve in quality, the deepfake voices may improve in quality as well. The deepfake algorithm(s) may be provided to the program.

In an embodiment, the program may automatically search the Internet, including the dark-web (websites without a traditional searchable URL), at predetermined intervals for additional, new, and improved deepfake algorithms.

In an embodiment, the program may create multiple deepfake voices using multiple deepfake algorithms. As malicious actors may use a variety of deepfake algorithms, the more deepfake algorithms used by the program, the more accurate the program may become in determining whether a caller or videoconference attendee is deep-faked.

The deepfake voices created by the program may be used by the program as exemplars of what a malicious actor may use in a spoofed or fake call or videoconference. The more, and more varied, deepfakes created by the program, the more exemplars the program may have to learn from and determine if a caller is a deepfake or not. For example, a particular deepfake program may be more accurate when it generates a voice cadence than another algorithm, while the other algorithm may be more accurate when it generates a tone or pitch. Every deepfake algorithm may vary different aspects of a voice and may therefore have a unique signature. The program may analyze the created deepfakes to learn how to detect these unique signature(s).

The program may store the two or more audio files, the voice baseline, the phone numbers/names, and the deepfake voices. In an embodiment, the two or more audio files will not be stored by the program. The database may be present on the same computer as the program or may be on a server or other computer distant from the program. The database may be accessible by the program. The database may be accessible by an administrator of the program. In an embodiment, the database may not be accessible by an administrator, for security purposes.

A recipient may receive a telephonic call from a caller (or user). A recipient may join a videoconference with a user (or caller). The telephonic call may include a telephonic voice belonging to the user/caller. Through caller-ID the recipient and/or the program may recognize that the call is originating or purportedly originating from the target individual. Malicious actors may be able to spoof caller-IDs to display a particular number, even if the call does not actually originate from that number.

The program may compare the telephonic voice, in real-time, to the voice baseline and the deepfake voices to determine when the telephonic voice is illegitimate. For example, when the program determines, through the comparison, that the telephonic voice is a deepfake, the program may determine that the telephonic voice is illegitimate. The program may listen in to the call (or videoconference) to analyze the telephonic voice of the caller/user. The program may record all or a snippet of the caller. The program may analyze the telephonic voice for cadence, tone, pitch, volume, accent, and other audio characteristics and compare those characteristics to the baseline and deepfake recordings in the database. The more powerful the computer running the program, the faster the program may perform this comparison. Any suitable comparison algorithm may be used. As the program may be performing the comparison in real-time during the call, more efficient comparison algorithms may be more suitable than other comparison algorithms. The comparison may be to a pre-determined threshold of accuracy, such as 75% or 90%.

When the program determines that the telephonic voice is illegitimate, the program may inform the recipient, inform a system administrator, and terminate the call (or videoconference). In an embodiment, the termination of the call may only occur after the program receives permission from the recipient or the administrator.

In an embodiment, when the program determines that the call is legitimate, the program may inform the recipient and/or the administrator of the legitimacy.

In an embodiment, the program may request the caller/user recite one or more words or phrases. The program may determine which words or phrases depending on the target individual's recordings and the created deepfake voices. The program may determine which words or phrases, or how many words or phrases to request depending on a pre-determined threshold level of accuracy. For example, if the program is only required to be correct 50% of the time, it may request fewer words or phrases compared to if the pre-determined threshold was set at 95%.

The call or videoconference may be encrypted. The call or videoconference may be over the Internet, through a cellular connection, bluetooth, wi-fi, a local area network, or any other suitable communication protocol.

In an embodiment, the program may also request a response from a system administrator as to whether the determination that that telephonic call or telephonic voice is illegitimate or legitimate is correct. For example, if the program determines that call X is illegitimate or that call Y is legitimate, the program may transmit the details of call X or Y to an administrator for a human in the loop determination. This determination may be used to refine the comparison algorithm or other algorithms of the program. The human in the loop determination may also increase the accuracy of the program, so that the program will terminate fewer legitimate calls.

In an embodiment, the system administrator may be the target individual. In this embodiment, the program may request the target individual verify or reject the determination that the telephonic voice(s) are fake or spoofed, or that a call is legitimate.

In an embodiment, a caller-ID display visible to the recipient may display a number and/or name belonging to the target individual. Malicious actors may be able to spoof a caller-ID display. The caller-ID display may also transmit the information displayed to the program, to allow the program to compare the telephonic voice with the correct voice baseline of the correct target individual.

In an embodiment, the database may be encrypted. Any suitable encryption method may be used. Encryption may prevent a malicious actor from attacking the database and gaining voice recordings and other information. Encryption may also increase the privacy of the targeted individual.

In an embodiment, the voice baseline, deepfake voices, comparison algorithm, and other determinations may be repeatedly refined. The program may take feedback or analysis through AI/ML algorithms to refine various aspects of its operation, including the determination of baselines, other characteristics, creation of deepfakes, comparison of calls to deepfakes and baselines, and determination of legitimate vs. illegitimate calls and voices. Any suitable AI/ML algorithms may be used, and multiple algorithms may be appropriate for analyzing more complex voices, calls, and feedback.

In an embodiment, the recipient may receive a second or "n" call, with a second or "n" telephonic voice, from an unknown number, not associated with the target individual. This second or "n" call may display on a caller-ID display a name of the target individual, even though the number may not be associated with the target individual. For example, if the target individual's name is "ABC" and phone number is 555-555-5555, a malicious actor may be able to spoof either the name or the number to appear on a caller-ID display. The caller-ID may display "ABC" and 555-555-5565 to trick a recipient into believing the call is originating from the target individual. Alternatively, "ABC" may have recently received a new phone number or may be calling from a personal phone number that was not provided to the program and which the program does not associate with "ABC". Alternatively, both the name and the number may be slightly different than the target individual's name and number, and the program may not know to compare the telephonic voice to the target individual.

In this embodiment, the program may receive an instruction from the recipient to compare the second telephonic voice with the voice baseline and the deepfake voices to determine if the second call is legitimate or illegitimate. When the program determines that the call is legitimate, it may inform the recipient and may update the information of the target individual with the new name and/or number.

When the program determines that the second call is illegitimate, the program may inform the recipient that the second call is illegitimate, inform a system administrator that the second call is illegitimate, and terminate the second telephonic call.

In an embodiment, the program may also record two or more audiovisual files of the target individual, separate from or in addition to the recorded audio files. The recordings may be made through a video camera in communication with the computer running the program. Audiovisual files may include both an audio component as well as a video component. Any standard video compression algorithm may be used, such as .mp4 or .avi.

The audiovisual files may include the target individual reciting into a video-camera two or more scripted lines each including ten or more distinct words. These may be the same or different scripted lines. The more scripted lines recorded audio-visually, the more accurate the program may be.

The program may analyze, through one or more artificial intelligence/machine learning ("AI/ML") algorithms, the two or more audiovisual files and determine an audiovisual baseline of the target individual. For example, if the target individual uses certain gestures or moves a facial feature in a particular way when pronouncing specific words more and other visual characteristics. Multiple unique audiovisual characteristics may be required for accurate determinations of legitimacy or illegitimacy. The audiovisual baseline may also include one or more videoconferencing user-IDs or names assigned to or belonging to the target individual.

The program may create, through one or more AI/ML deepfake algorithms, one or more deepfake audiovisual representations of the target individual. Audiovisual representations may include various background images. Generally, deepfake audiovisual representations may create a mask or other overlay to cover an existing audiovisual image/video.

The program may store the two or more audiovisual files, the audiovisual baseline, and the deepfake audiovisual representations in the database. The database may be encrypted with any suitable encryption algorithm or method. Encrypting the database may increase the targeted individual's privacy and prevent malicious activity from gaining the output of the program as well as other data.

The more deepfake audiovisual representations created, along with the use of additional and distinct deepfake algorithms, may make the program more accurate when comparing videoconference calls in real-time to determine legitimacy or illegitimacy.

The recipient may join a videoconference with a user displaying a user-ID or name belonging or assigned to the target individual. The user may initiate the videoconference, the recipient may initiate the videoconference, or someone else may initiate the videoconference.

The program may compare, in real-time, the user's audiovisual representation with the audiovisual baseline, and the deepfake audiovisual representations to determine whether the user's audiovisual representation is legitimate or illegitimate.

When the program determines that the user's audiovisual representation is legitimate, it may inform the recipient and allow the videoconference to proceed. When the program determines that the user's audiovisual representation is illegitimate, the program may inform the recipient that the videoconference is illegitimate, inform the system administrator that the videoconference is illegitimate, and terminate the videoconference.

In an embodiment, the recipient may receive a voicemail which may include a third or "n" telephonic voice. The voicemail may be from a known or unknown name or phone number. The program may receive an instruction from the recipient to compare the third telephonic voice with the voice baseline and the deepfake voices to determine if the voicemail is legitimate or illegitimate. As this is not a real-time comparison, different and more robust or powerful, but slower, comparison algorithms may be used. When the program determines that the voicemail is illegitimate, the program may inform the recipient that the voicemail is illegitimate and inform a system administrator that the voicemail is illegitimate.

A defensive deepfake computer program product is provided. The computer program product may include executable instructions. The executable instructions may be stored on non-transitory memory. The executable instructions may be executed by a processor on a computer system to perform various functions.

The program may record two or more audiovisual files of a target individual reciting two or more scripted lines wherein each scripted line comprises ten or more distinct words. Any suitable audiovisual file type may be used.

The program may analyze the two or more audiovisual files to determine an audiovisual baseline of the target individual. The audiovisual baseline may be used by the program to identify the target individual. The audiovisual baseline may include unique visual and auditory characteristics of the target individual. The audiovisual baseline may include one or more videoconferencing user-IDs and/or names assigned to or belonging to the target individual. The analysis may be performed through one or more artificial intelligence/machine learning ("AI/ML") algorithms. Any suitable AI/ML algorithm or algorithms may be used.

The program may create, through one or more AI/ML deepfake algorithms, one or more deepfake audiovisual representations of the target individual. These deepfake audiovisual representations may be used as a proxy for how the target individual would appear and sound like if a malicious actor would attempt to create a deepfake audiovisual representation of the target individual. The deepfake audiovisual representations may be used as exemplars of what a malicious actor may use in a spoofed or fake videoconference. The program may analyze the exemplars to determine unique deepfake audiovisual characteristics. These unique deepfake characteristics may be unique to each particular deepfake algorithm used. Each deepfake algorithm may approach creating a deepfake audiovisual representation in a unique method, creating subtle, but identifiable, differences between the outputs of each deepfake algorithm.

The program may store the two or more audiovisual files, the audiovisual baseline, and the one or more deepfake audiovisual representations in a deepfake archive. The deepfake archive may be a part of a database. The database may be present on the same computer as the program or may be on a server or other computer distant from the program.

A recipient may join a videoconference with a user displaying a user-ID or name belonging or assigned to the target individual. The user may initiate the videoconference, the recipient may initiate the videoconference, or someone else may initiate the videoconference.

The program may compare, in real-time, the user's audiovisual representation with the audiovisual baseline, and the deepfake audiovisual representations to determine whether the user's audiovisual representation is legitimate or illegitimate. The program may determine whether the user's representation is a deepfake or not.

When the program determines that the user's audiovisual representation is legitimate, it may inform the recipient and allow the videoconference to proceed. When the program determines that the user's audiovisual representation is illegitimate, the program may inform the recipient that the videoconference is illegitimate, inform the system administrator that the videoconference is illegitimate, and terminate the videoconference.

In an embodiment, the deepfake archive in the database may include one or more deepfake images of the target individual, separate from and in addition to the deepfake audiovisual representations. The deepfake images may be used to increase the accuracy of the program in general and the accuracy of the program's comparisons by providing additional comparison points.

In an embodiment, the recipient may receive a video-message which may include an audiovisual representation of a user. The video-message may be from a known or unknown name or user-ID. The video-message may be in any appropriate format. The program may receive an instruction from the recipient of the video-message to compare the audiovisual representation with the audiovisual baseline and the deepfake representations to determine if the video-message is legitimate or illegitimate. As this is not a real-time comparison, different and more robust or powerful, but slower, comparison algorithms may be used. When the program determines that the video-message is illegitimate, the program may inform the recipient that the video-message is illegitimate and inform a system administrator that the video-message is illegitimate. The program may delete the video-message. The program may store the video-message for record keeping purposes or other purposes.

In an embodiment, the program may also request a response from a system administrator as to whether the determination that that audiovisual representation, video-message, or videoconference is illegitimate or legitimate is correct. For example, if the program determines that videoconference X is illegitimate or that videoconference Y is legitimate, the program may transmit the details of videoconference X or Y to an administrator for a human in the loop determination. This determination may be used to refine the comparison algorithm or other algorithms of the program. The human in the loop determination may also increase the accuracy of the program, so that the program will not terminate legitimate videoconferences.

In an embodiment, the system administrator may be the target individual. In this embodiment, the program may request the target individual verify or reject the determination that the audiovisual representations are fake or spoofed, or that a videoconference is legitimate.

In an embodiment, the audiovisual baseline, deepfake audiovisual representations, comparison algorithm, and other determinations may be repeatedly refined. The program may take feedback or analysis through AI/ML algorithms to refine various aspects of its operation, including the determination of baselines, other characteristics, creation of deepfakes, comparison of videos, videoconferences, and video-messages to deepfakes and baselines, and determination of legitimate vs. illegitimate videoconferences, videos, video-messages, and audiovisual representations. Any suitable AI/ML algorithms may be used, and multiple algorithms may be appropriate for analyzing more complex voices, calls, and feedback.

A method for utilizing deepfake images defensively is provided. The method may include the step of providing, by a defensive deepfake computer program, a target individual with two or more scripted lines for the target individual to recite into a camera or microphone. Each scripted line may include ten or more distinct words.

The method may include recording, by a video-camera in communication with the computer program, two or more audiovisual files of the target individual reciting the scripted lines. The camera may be located proximate to the computer program or may be connected over a network, such as the Internet, to the computer program. The camera may be located on a device belonging to the target individual, such as a smartphone.

The method may include analyzing, by the program through one or more artificial intelligence/machine learning ("AI/ML") algorithms, the audiovisual files to determine an audiovisual baseline. The audiovisual baseline may also include one or more videoconferencing user-IDs or names assigned to or belonging to the target individual.

The method may include the step of creating, by the program through one or more AI/ML deepfake algorithms, one or more deepfake audiovisual representations of the target individual. The method may include the step of storing the two or more audiovisual files, the audiovisual baseline, and the one or more deepfake audiovisual representations in a database.

In an embodiment, the program may analyze the deepfake audiovisual representations to learn and iteratively train the program to detect deepfake audiovisual representations. For example, the program may analyze the created deepfake representations to ascertain certain characteristics of deepfake representations that the program would recognize when reviewing a video or videoconference. As each deepfake algorithm uses a unique method/program to create a deepfake, each algorithm may have a unique and identifiable signature. The method may include training the program to identify the unique deepfake signature(s) as well as training to identify deepfakes on a video. The method may include receiving feedback to iteratively train the program.

The method may include a recipient joining a videoconference with a user. The user may display a name or user-ID associated with the target individual. The videoconference may include an audiovisual representation of the user. The videoconference may take place over an internal or external network. The network may be the Internet.

The method may include the step of the program comparing the user's audiovisual representation on the videoconference, in real-time, to the deepfake audiovisual representations to determine when the videoconference (i.e., the user's audiovisual representations) is legitimate or illegitimate. When the program determines that the user's audiovisual representation is illegitimate, the method may include the step of the program informing the recipient, informing a system administrator, and terminating the videoconference.

In an embodiment, the method may include the defensive deepfake computer program being executed on an apparatus. The apparatus may include a computer. The computer may be a server, desktop computer, mobile computer, tablet, or other type of computer.

The computer may include a communication link, a processor or processors, a video-camera, and a non-transitory memory configured to store executable data configured to run on the processor, among other components. The executable data may include an operating system and the defensive deepfake computer program. In an embodiment, the video-camera may be remote from the apparatus but in electronic communication with the apparatus through the communication link or other appropriate hardware.

A processor(s) may control the operation of the apparatus and its components, which may include RAM, ROM, an input/output module, and other memory. The microprocessor may also execute all software running on the apparatus. Other components commonly used for computers, such as EEPROM or Flash memory or any other suitable components, may also be part of the apparatus.

A communication link may enable communication with a recipient computer or video conferencing system as well as any server or servers. The communication link may include any necessary hardware (e.g., antennae) and software to control the link. Any appropriate communication link may be used. In an embodiment, the network used may be the Internet. In another embodiment, the network may be an internal intranet.

In an embodiment, the method may also include the step of requesting a response from the system administrator whether the determination that the user's audiovisual representation is illegitimate or legitimate is correct.

The method may include the step of repeatedly refining the audiovisual baseline, the deepfake audiovisual representations, the comparison algorithm, as well as any other algorithm used by the program.

The program may be used to create one or more baselines for multiple targeted individuals.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or a human, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as a defensive deepfake program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as a defensive deepfake program and security protocols) along with any other data 111 (information about each target individual) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as a defensive deepfake program and security protocols) along with any data needed for the operation of the apparatus and to allow authentication of a user. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for a defensive deepfake program and security protocols, as well as other programs. In an embodiment, one or more programs, or aspects of a program, may use one or more AI/ML algorithm(s). The various tasks may be related to using deepfakes to determine the legitimacy or illegitimacy of phone calls and videoconferences in real time.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
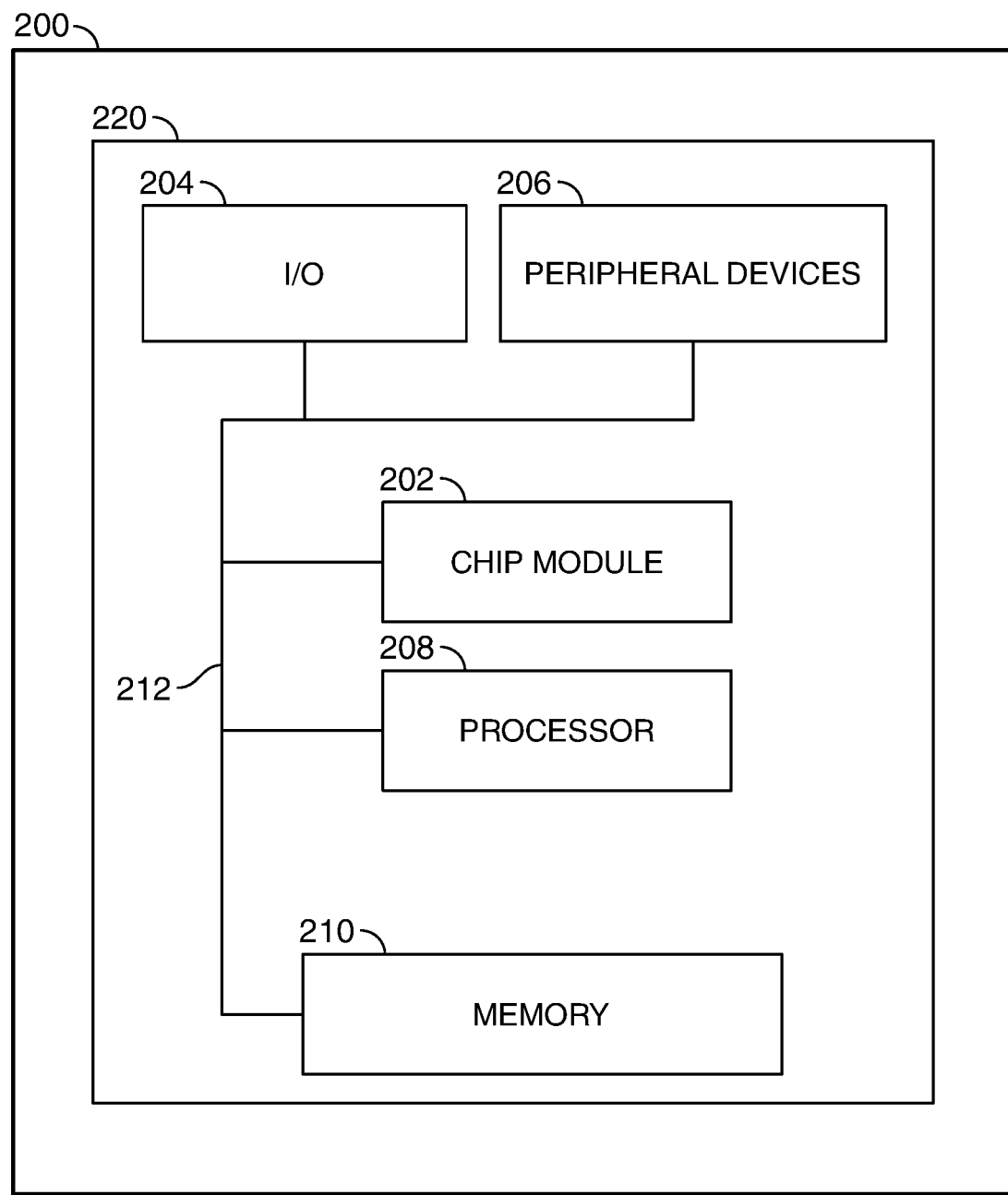
FIG. 2 shows an illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1, 3, and 6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
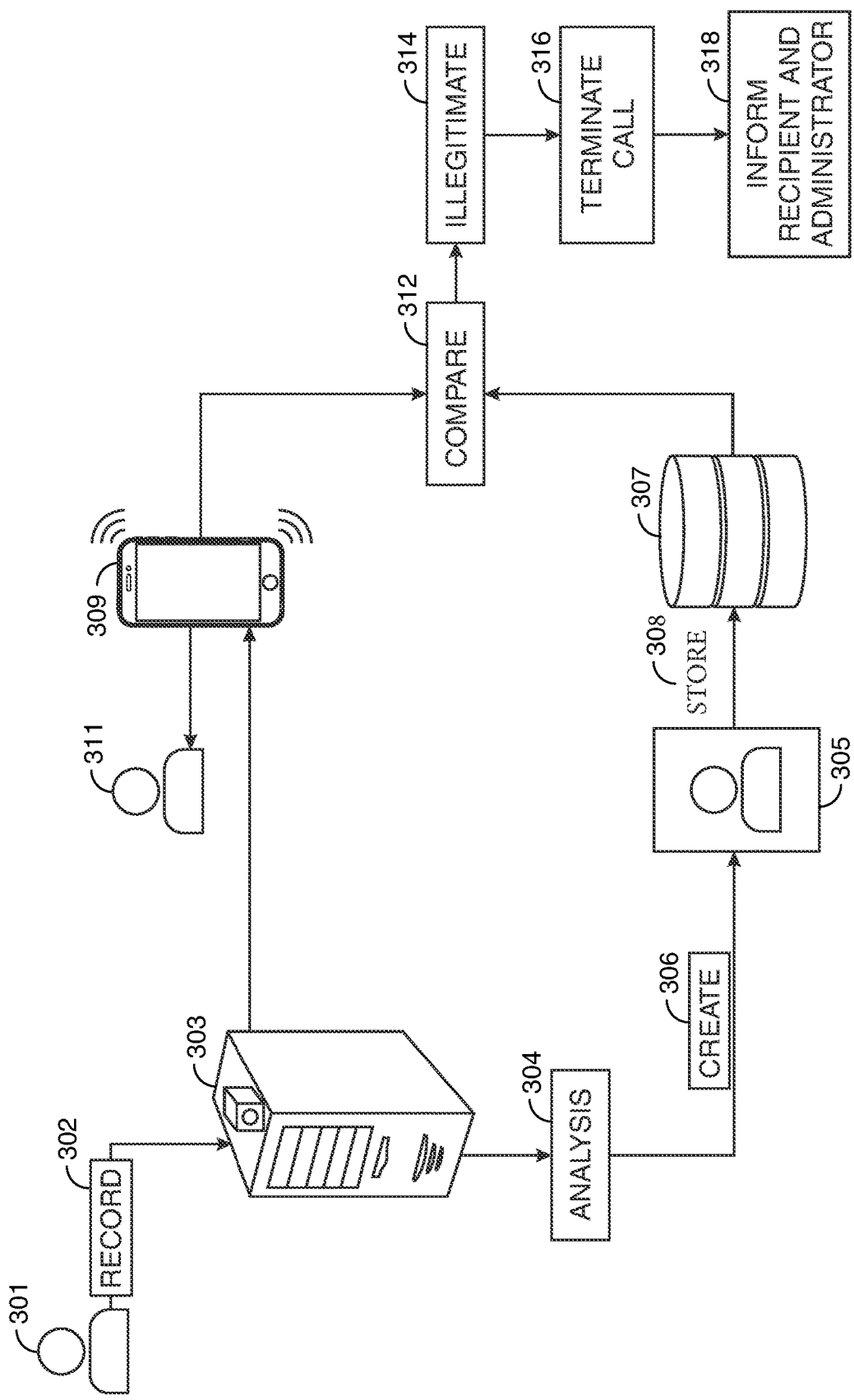
FIG. 3 shows an illustrative schematic in accordance with principles of the disclosure.

FIG. 3 shows an illustrative schematic in accordance with principles of the disclosure. Apparatus may include any of the users, components and systems odd-numbered 301 through 311, among other components. Methods may include some or all of the method steps even-numbered 302 through 318. Methods may include the steps illustrated in FIG. 3 in an order different from the illustrated order. The illustrative method shown in FIG. 3 may include one or more steps performed in other figures or described herein. Steps 302 through 316 may be performed on the apparatus shown in FIG. 3 or other apparatus shown in other figures or elsewhere.

At step 302, a computer 303 running a defensive deepfake program (not shown) may record a target individual 301 reciting exemplary words or phrases with a camera. The program may analyze the recordings at step 304. At step 306, the program may create deepfake audiovisual representations 305. At step 308, the program may store the created deepfake audiovisual representations 305 in a database 307.

At step 310, the program may analyze an incoming call or videoconference 309. The incoming call or videoconference 309 may be directed to a recipient 311. The call or videoconference 309 may include an audiovisual representation of a user.

At step 312, the program may compare, in real-time, audiovisual representations of the user of the incoming call or videoconference with the data stored in database 307 to determine if the call or videoconference is legitimate or illegitimate.

When the program determines that the call or videoconference is illegitimate at step 314, at step 316, the program may terminate the call or videoconference and at step 318 the program may inform the recipient 311 and a system administrator.

Figure 4:
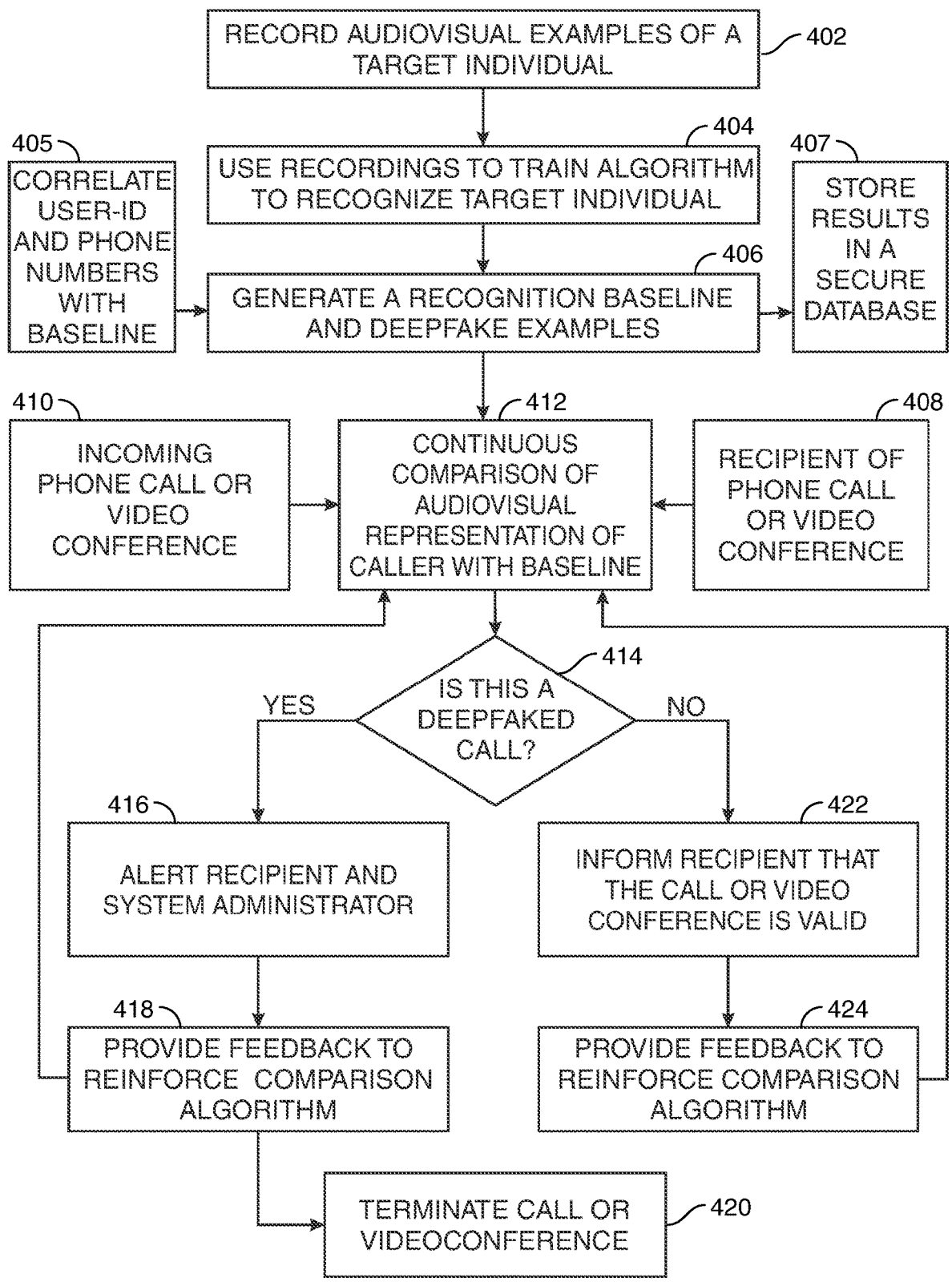
FIG. 4 shows an illustrative flowchart in accordance with principles of the disclosure.

FIG. 4 shows an illustrative flowchart in accordance with principles of the disclosure. Methods may include some or all of the method steps numbered 402 through 424. Methods may include the steps illustrated in FIG. 4 in an order different from the illustrated order. The illustrative method shown in FIG. 4 may include one or more steps performed in other figures or described herein. Steps 402 through 424 may be performed on the apparatus shown in FIGS. 1-3, and 6 or other apparatus.

At step 402, a defensive deepfake computer program may audiovisual examples of a target individual.

At step 404, the program may use the audiovisual examples to train a deepfake AI/ML algorithm to generate a recognition baseline. At step 405, the target individual's name and/or userIDs may be correlated with the baseline. At step 406, the program may generate a recognition baseline along with deepfake examples. The baseline and deepfake examples may be used to train the program to recognize and differentiate between legitimate and illegitimate calls and videoconferences in real time. At step 407, the results of the program may be stored in a database.

At step 408, a recipient of a call or videoconference may provide access to the call or videoconference to the program. In an embodiment, this step may be automatic, wherein the program automatically monitors all calls and videoconferences of a recipient.

At step 410, the program may receive the incoming call or videoconference.

At step 412, the program may compare the incoming caller's audiovisual representation on the call or videoconference, in real-time, to the deepfake audiovisual representations and the baseline (stored in the database at step 407) to determine when the call or videoconference (i.e., the user's audiovisual representations) is legitimate or illegitimate.

At step 414, the program may determine if the incoming call or videoconference is legitimate or illegitimate (deepfaked/spoofed).

When the program determines that the user's audiovisual representation is illegitimate, at step 416 the program may alert the recipient and a system administrator, and at step 420 terminate the videoconference or call.

At step 418, when the program determines the accounts or posts are illegitimate, the program may transmit the information to a system administrator or other human user for a quality assurance check and verification that the call or videoconference is illegitimate. In an embodiment, the human user may be the target individual. In an embodiment, the program may transmit the information to another program instead of or in addition to a human user. Also at step 418, the human user may provide feedback to the program to reinforce the algorithms within the program. For example, the user may inform the program that it was correct or incorrect in its comparison results. The user may state that call or videoconference was legitimate or illegitimate.

At step 422, when the program determines the call or videoconference is legitimate, the program may inform the recipient that the call or videoconference is legitimate. The program may also transmit the information to a system administrator or other human user for a quality assurance check and verification that the call or videoconference is legitimate. In an embodiment, the human user may be the target individual.

At step 424, the human user may provide feedback to the program to reinforce the algorithms within the program. For example, the user may inform the program that it was correct or incorrect in its comparison results.

Figure 5:
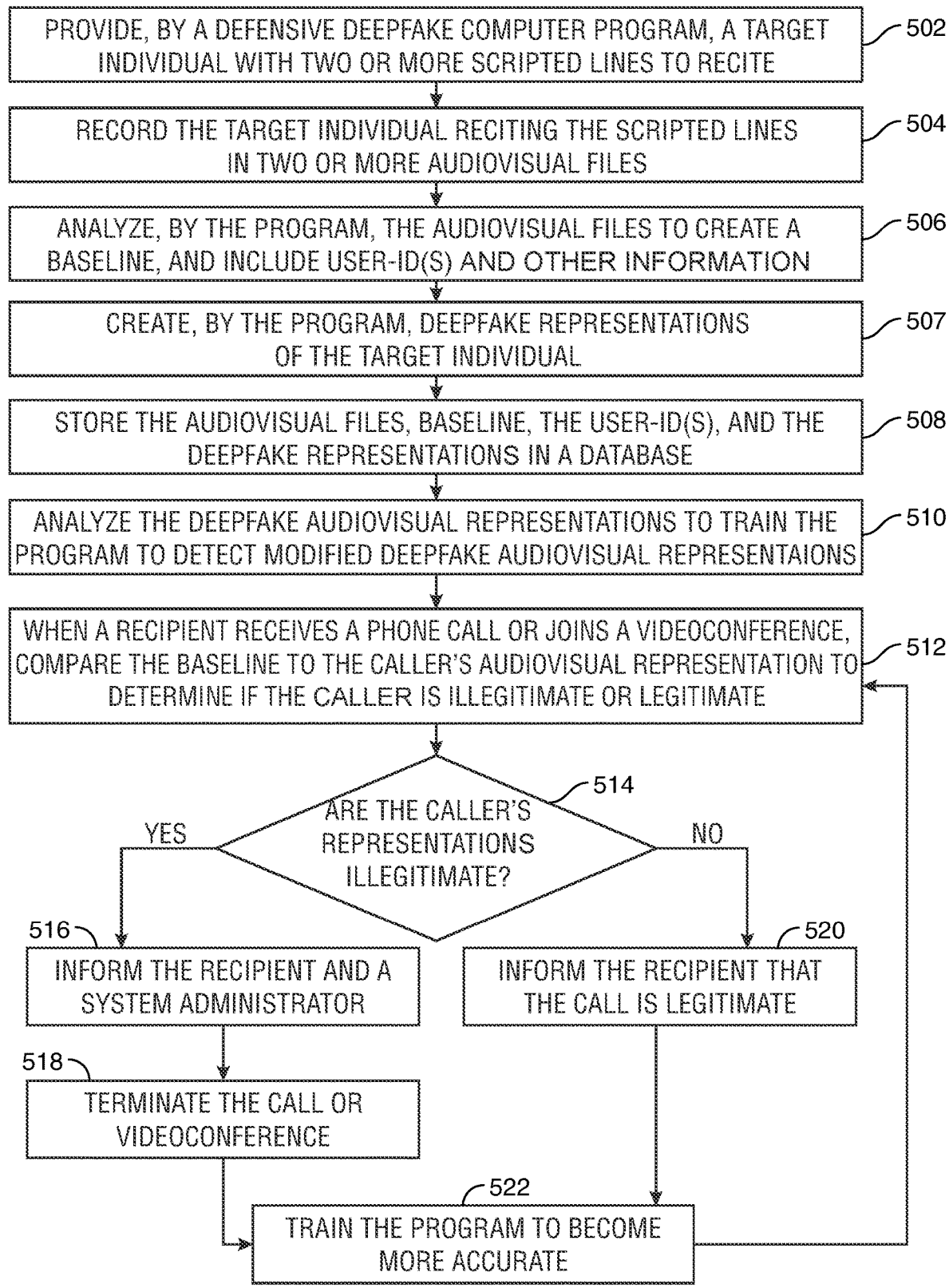
FIG. 5 shows an illustrative flowchart in accordance with principles of the disclosure.

FIG. 5 shows an illustrative flowchart in accordance with principles of the disclosure. Methods may include some or all of the method steps numbered 502 through 522. Methods may include the steps illustrated in FIG. 5 in an order different from the illustrated order. The illustrative method shown in FIG. 5 may include one or more steps performed in other figures or described herein. Steps 502 through 522 may be performed on the apparatus shown in FIGS. 1-3, and 6, or other apparatus.

At step 502, a defensive deepfake computer program (on a server or other computer system) may provide a target individual with two or more scripted lines to recite. The more lines (words or phrases) recited, the more accurate the program may be.

At step 504, the program may record the target individual reciting the scripted lines in two or more audiovisual files. The program may use a camera to record the target individual.

At step 506 the program may analyze the recorded audiovisual files to create a baseline. The baseline may also include user-IDs or names assigned to or belonging to the target individual.

At step 507, the program may create deepfake audiovisual representations of the target individual, based on the analysis and recordings. The deepfake audiovisual representations may be analyzed to determine unique deepfake characteristics that the program may use to identify deepfakes. Each separate deepfake algorithm used may have a different and identifiable signature/characteristics. Any suitable deepfake algorithm(s) may be used, and the more deepfake exemplars created, the more accurate the program may be when determining if a call or videoconference is legitimate or illegitimate.

At step 508, the program may store the audiovisual files, the baseline, the user-IDs and names, and the deepfake audiovisual representations in a database. The database may be located on the same computer system as the program or a remote computer system. The database may be encrypted.

At step 510, the program may analyze the deepfake audiovisual representations to train the program to detect modified deepfake audiovisual representations.

At step 512, when a recipient receives a call or joins a videoconference, the program may compare the audiovisual representations of the caller or user of the videoconference with the baseline and with the deepfake audiovisual representations to determine whether the call or videoconference is legitimate or not. A call or videoconference that includes a deepfake audiovisual representation may be more likely to be illegitimate than call or videoconference that does not include any deepfakes. The comparison may be to a pre-determined threshold level of legitimacy, such as 51%, or 75%. The lower the level, the more legitimate calls/videoconferences the program may determine incorrectly as illegitimate. Conversely, the higher the level, the more illegitimate calls/videoconferences the program may determine as legitimate, incorrectly. The level may be modified by a user or system administrator.

In an embodiment, the program may automatically modify the threshold level as it learns from past history. For example, if the program is generating too many false positives (illegitimate calls/videoconferences), it may raise the threshold level.

At step 514, the program may make the determination of legitimacy or illegitimacy.

In some embodiments, at step 516, when a call/videoconference is determined to be illegitimate, the program may inform the recipient and a system administrator. The program may also verify by asking an administrator, other user, or the target individual to make a determination of legitimacy or illegitimacy.

At step 518, the program may terminate the call or videoconference.

In some embodiments, at step 520, when the program determines a call/videoconference to be legitimate, the program may inform the recipient that the call/videoconference is legitimate. The program may also verify its determination by asking an administrator, other user, or the target individual to make a determination of legitimacy or illegitimacy.

At step 522, the program may take any results of the comparison (steps 512-520) to train itself to become more accurate iteratively. For example, if a human reviewer consistently determines that the program is inaccurate at steps 512-520, the program may refine its comparison and analysis algorithm(s) to become more accurate and reduce its error rate.

Figure 6:
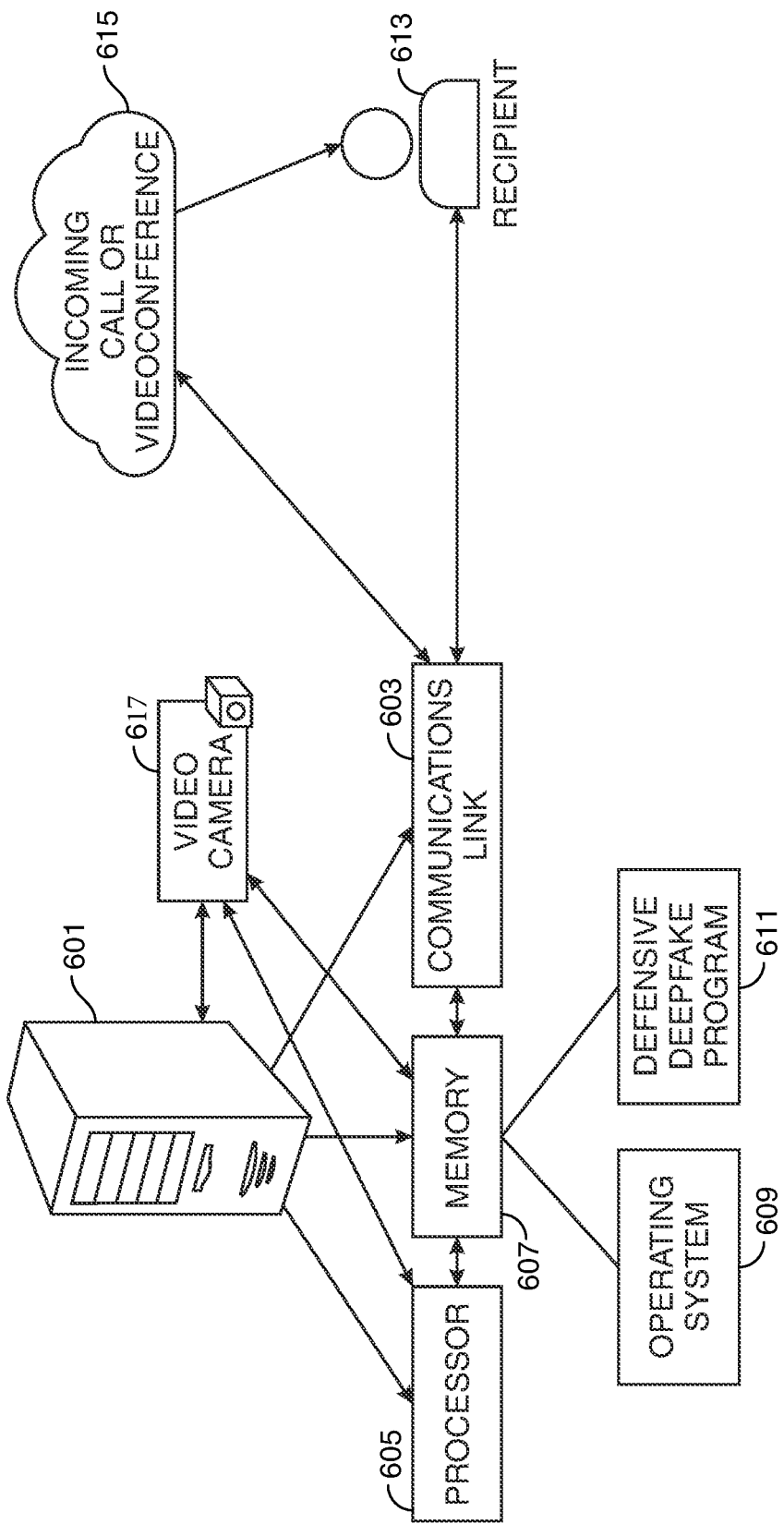
FIG. 6 shows an illustrative apparatus in accordance with principles of the disclosure.

FIG. 6 shows an illustrative apparatus in accordance with principles of the disclosure. A server/computer 601 may include a communication link 603, a processor/processors 605, and a non-transitory memory 607, a video camera 617, as well as other components.

The non-transitory memory 607 may include an operating system 609, and a defensive deepfake program 611, as well as other data and programs.

The communications link 603 may communicate with an incoming call or videoconference 615 and recipient 613 to analyze the incoming call or videoconference for deepfake voices or audiovisual representations of a target individual.

The communications link 603 may communicate directly or indirectly with the camera 617, incoming call 615 or call recipient 613. An external network may be the Internet. An internal network may be an intranet. An internal network may use Internet protocols.

Thus, apparatus and methods for using deepfakes defensively to detect fake and spoofed calls and videoconferences in real-time and then terminate illegitimate calls and videoconferences are provided. Persons skilled in the art will appreciate that the present invention can be practiced by other than the described embodiments, which are presented for purposes of illustration rather than of limitation.

What is claimed is:

1. A real-time defensive deepfake computer program product, the computer program product comprising executable instructions, the executable instructions when executed by a processor on a computer system:

automatically, at a pre-determined interval, search the Internet for one or more AI/ML deepfake algorithms;

19 transmit a message to a mobile device belonging to a target individual,
wherein the message comprises two or more scripted lines each comprising ten or more distinct words;
 record two or more audio files of the target individual reciting the two or more scripted lines;
 analyze, through one or more artificial intelligence/machine learning ("AI/ML") algorithms, the two or more audio files to determine a voice baseline of the target individual, wherein the voice baseline further comprises one or more phone numbers assigned to the target individual;
 create, through the one or more AI/ML deepfake algorithms, one or more deepfake voices of the target individual;
 store the two or more audio files, the voice baseline, and the one or more deepfake voices in a database; and,
 when a recipient receives a telephonic call comprising a telephonic voice from one of the one or more phone numbers:
  compare the telephonic voice with the voice baseline and the one or more deepfake voices, in real-time, to determine when the telephonic voice is illegitimate; and,
  when the telephonic voice is illegitimate:
   inform the recipient that the telephonic call is illegitimate;
   inform a system administrator that the telephonic call is illegitimate; and
   automatically terminate the telephonic call.

2. The defensive deepfake computer program product of claim 1 wherein the executable instructions further request a response from the system administrator whether the determination that the telephonic call is illegitimate is correct.

3. The defensive deepfake computer program product of claim 1 wherein the system administrator is the target individual.

4. The defensive deepfake computer program product of claim 1 wherein a caller-ID display belonging to the recipient of the telephonic call displays a name of the target individual.

5. The defensive deepfake computer program product of claim 1 wherein the two or more audio files, the voice baseline, and the one or more deepfake voices in the database are encrypted.

6. The defensive deepfake computer program product of claim 1 wherein the voice baseline is repeatedly refined.

7. The defensive deepfake computer program product of claim 1 wherein the one or more deepfake voices are repeatedly refined.

8. The defensive deepfake computer program product of claim 1 wherein when the recipient receives a second telephonic call comprising a second telephonic voice from an unknown number with a caller-ID display displaying a name of the target individual, the executable instructions further:
 receive an instruction from the recipient to compare the second telephonic voice with the voice baseline and the one or more deepfake voices;
 compare the second telephonic voice with the voice baseline and the one or more deepfake voices, in real-time, to determine when the second telephonic voice is illegitimate; and,
 when the second telephonic voice is illegitimate:
  inform the recipient that the second telephonic call is illegitimate;

20 inform the system administrator that the second telephonic call is illegitimate; and
  terminate the second telephonic call.

9. The defensive deepfake computer program product of claim 1 wherein the executable instructions further:
 record two or more audiovisual files of the target individual reciting two or more scripted lines wherein each scripted line comprises ten or more distinct words;
 analyze, through one or more artificial intelligence/machine learning ("AI/ML") algorithms, the two or more audiovisual files to determine an audiovisual baseline of the target individual, wherein the audiovisual baseline further comprises one or more videoconferencing user-IDs assigned to the target individual;
 create, through one or more AI/ML deepfake algorithms, one or more deepfake audiovisual representations of the target individual;
 store the two or more audiovisual files, the audiovisual baseline, and the one or more deepfake audiovisual representations in the database; and,
 when the recipient joins a videoconference with a user displaying one of the one or more videoconference user-IDs, wherein the videoconference comprises an audiovisual representation of the user:
  compare the user's audiovisual representation with the audiovisual baseline and the one or more deepfake audiovisual representations, in real-time, to determine when the user's audiovisual representation is illegitimate; and,
  when the user's audiovisual representation is illegitimate:
   inform the recipient that the videoconference is illegitimate;
   inform the system administrator that the videoconference is illegitimate; and
   terminate the videoconference.

10. The defensive deepfake computer program product of claim 1 wherein when the recipient receives a voicemail comprising a third telephonic voice, the executable instructions further:
 receive an instruction from the recipient to compare the third telephonic voice with the voice baseline and the one or more deepfake voices;
 compare the third telephonic voice with the voice baseline and the one or more deepfake voices, in real-time, to determine when the third telephonic voice is illegitimate; and,
 when the third telephonic voice is illegitimate:
  inform the recipient that the voicemail is illegitimate; and
  inform the system administrator that the voicemail is illegitimate.

11. A real-time defensive deepfake computer program product, the computer program product comprising executable instructions, the executable instructions when executed by a processor on a computer system:
 automatically, at a pre-determined interval, search the Internet for one or more AI/ML deepfake algorithms;
 transmit a message to a mobile device belonging to a target individual,
wherein the message comprises two or more scripted lines each comprising ten or more distinct words;
 record two or more audiovisual files of the target individual reciting the two or more scripted lines;
 analyze, through one or more artificial intelligence/machine learning ("AI/ML") algorithms, the two or more audiovisual files to determine an audiovisual baseline of the target individual, wherein the audiovisual baseline further comprises one or more videoconferencing user-IDs assigned to the target individual;

create, through the one or more AI/ML deepfake algorithms, one or more deepfake audiovisual representations of the target individual;

store the two or more audiovisual files, the audiovisual baseline, and the one or more deepfake audiovisual representations in a deepfake archive; and, when a recipient joins a videoconference with a user displaying one of the one or more videoconference user-IDs, wherein the videoconference comprises an audiovisual representation of the user:

compare the user's audiovisual representation with the audiovisual baseline and the one or more deepfake audiovisual representations, in real-time, to determine when the user's audiovisual representation is illegitimate; and, when the user's audiovisual representation is illegitimate:

inform the recipient that the videoconference is illegitimate;

inform the system administrator that the videoconference is illegitimate; and terminate the videoconference.

12. The defensive deepfake computer program product of claim 11 wherein the deepfake archive further comprises one or more deepfake images of the target individual.

13. The defensive deepfake computer program product of claim 11 wherein when the recipient receives a video-message comprising an audiovisual representation of a user, the executable instructions further:

receive an instruction from the recipient to compare the user's audiovisual representation with the audiovisual baseline and the one or more deepfake audiovisual representations;

compare the user's audiovisual representation with the audiovisual baseline and the one or more deepfake audiovisual representations, to determine when the user's audiovisual representation is illegitimate; and, when the user's audiovisual representation is illegitimate:

inform the recipient that the video-message is illegitimate; and inform the system administrator that the video-message is illegitimate.

14. The defensive deepfake computer program product of claim 11 wherein the audiovisual baseline is repeatedly refined.

15. The defensive deepfake computer program product of claim 11 wherein the one or more deepfake audiovisual representations are repeatedly refined.

16. The defensive deepfake computer program product of claim 11 wherein the executable instructions further request a response from the system administrator whether the determination that the user's audiovisual representation is illegitimate is correct.

17. A method for utilizing deepfakes defensively in real-time, the method comprising the steps of:

automatically, at a pre-determined interval, searching the Internet for one or more AI/ML deepfake algorithms;

providing, by a defensive deepfake computer program transmitting a message to a mobile device belonging to a target individual, the target individual with two or more scripted lines wherein each scripted line comprises ten or more distinct words;

recording, by a camera of the mobile device in communication with the defensive deepfake computer program, two or more audiovisual files of the target individual reciting the two or more scripted lines;

analyzing, by the program through one or more artificial intelligence/machine learning ("AI/ML") algorithms, the two or more audiovisual files to determine an audiovisual baseline of the target individual, wherein the audiovisual baseline further comprises one or more videoconferencing user-IDs assigned to the target individual;

creating, by the program through the one or more AI/ML deepfake algorithms, one or more deepfake audiovisual representations of the target individual;

storing, in a deepfake archive, the two or more audiovisual files, the audiovisual baseline, and the one or more deepfake audiovisual representations; and, analyzing the deepfake audiovisual representations to train the program to detect modified deepfake audiovisual representations; and when a recipient joins a videoconference with a user displaying one of the one or more videoconference user-IDs, wherein the videoconference comprises an audiovisual representation of the user:

comparing the user's audiovisual representation with the audiovisual baseline and the one or more deepfake audiovisual representations, in real-time, to determine when the user's audiovisual representation is illegitimate; and, when the user's audiovisual representation is illegitimate:

informing the recipient that the videoconference is illegitimate;

informing the system administrator that the videoconference is illegitimate; and terminating the videoconference.

18. The method of claim 17 wherein the defensive deepfake computer program is executed on an apparatus comprising a computer, the computer comprising:

a communication link;

a processor;

a video camera; and a non-transitory memory configured to store executable data configured to run on the processor comprising:

an operating system; and the defensive deepfake computer program.

19. The method of claim 17 further comprising the step of requesting a response from the system administrator whether the determination that the user's audiovisual representation is illegitimate is correct.

20. The method claim 17 further comprising the step of repeatedly refining the audiovisual baseline and the deepfake audiovisual representations.

* * * * *